United States Patent [19]

Taciuk

[11] 4,280,879
[45] Jul. 28, 1981

[54] APPARATUS AND PROCESS FOR RECOVERY OF HYDROCARBONS FROM INORGANIC HOST MATERIALS

[75] Inventor: William Taciuk, Calgary, Canada

[73] Assignee: Alberta Oil Sands Technology and Research Authority, Edmonton, Canada

[21] Appl. No.: 91,910

[22] Filed: Nov. 6, 1979

Related U.S. Application Data

[63] Continuation-in-part of Ser. No. 34,098, Apr. 27, 1979, abandoned, which is a continuation of Ser. No. 828,119, Aug. 27, 1977, abandoned, which is a continuation-in-part of Ser. No. 603,044, Aug. 8, 1975, abandoned.

[30] Foreign Application Priority Data

Aug. 5, 1975 [CA] Canada ................................ 232862

[51] Int. Cl.³ ........................... C10B 1/10; C10B 7/00
[52] U.S. Cl. ....................................... 202/100; 201/18; 201/25; 201/32; 201/14; 202/117; 202/136; 422/209
[58] Field of Search ................ 422/209, 210; 202/100, 202/117, 133, 136, 216, 218; 201/32, 33; 34/128; 432/106, 108

[56] References Cited

U.S. PATENT DOCUMENTS

| | | | |
|---|---|---|---|
| 1,641,108 | 8/1927 | West | 34/128 |
| 1,751,127 | 3/1930 | Canting | 202/100 X |
| 2,813,822 | 11/1957 | Collier | 202/131 X |
| 2,822,153 | 2/1958 | Arnold | 55/DIG. 32 |
| 3,481,720 | 12/1969 | Bennett | 48/89 |
| 3,787,292 | 1/1974 | Keappler | 202/131 X |

*Primary Examiner*—Michael S. Marcus

[57] ABSTRACT

A dry thermal processor for recovering hydrocarbons from oil sand solids comprises concentric, radially spaced, horizontal inner and outer tubular members connected for rotation together. The inner member provides a substantially open preheat zone and vaporization zone while the outer member provides, in the annular space between the tubular members, a substantially open combustion zone and heat transfer zone. The ends of the outer member are sealed by stationary feed end and product end structures. Advance means move the oil sand solids from the feed end structure through the preheat and vaporization zones to the product end structure and back through the combustion and heat transfer zones. Rotation of the inner member causes size reduction of the oil sand feed in the preheat zone, and oversize is discharged directly into the annular space at the second end of the preheat zone. Separate means are provided for removing the gases produced in the zones, said means maintaining the gaseous atmospheres in the preheat zone, vaporization zone and annular space substantially segregated from each other.

9 Claims, 18 Drawing Figures

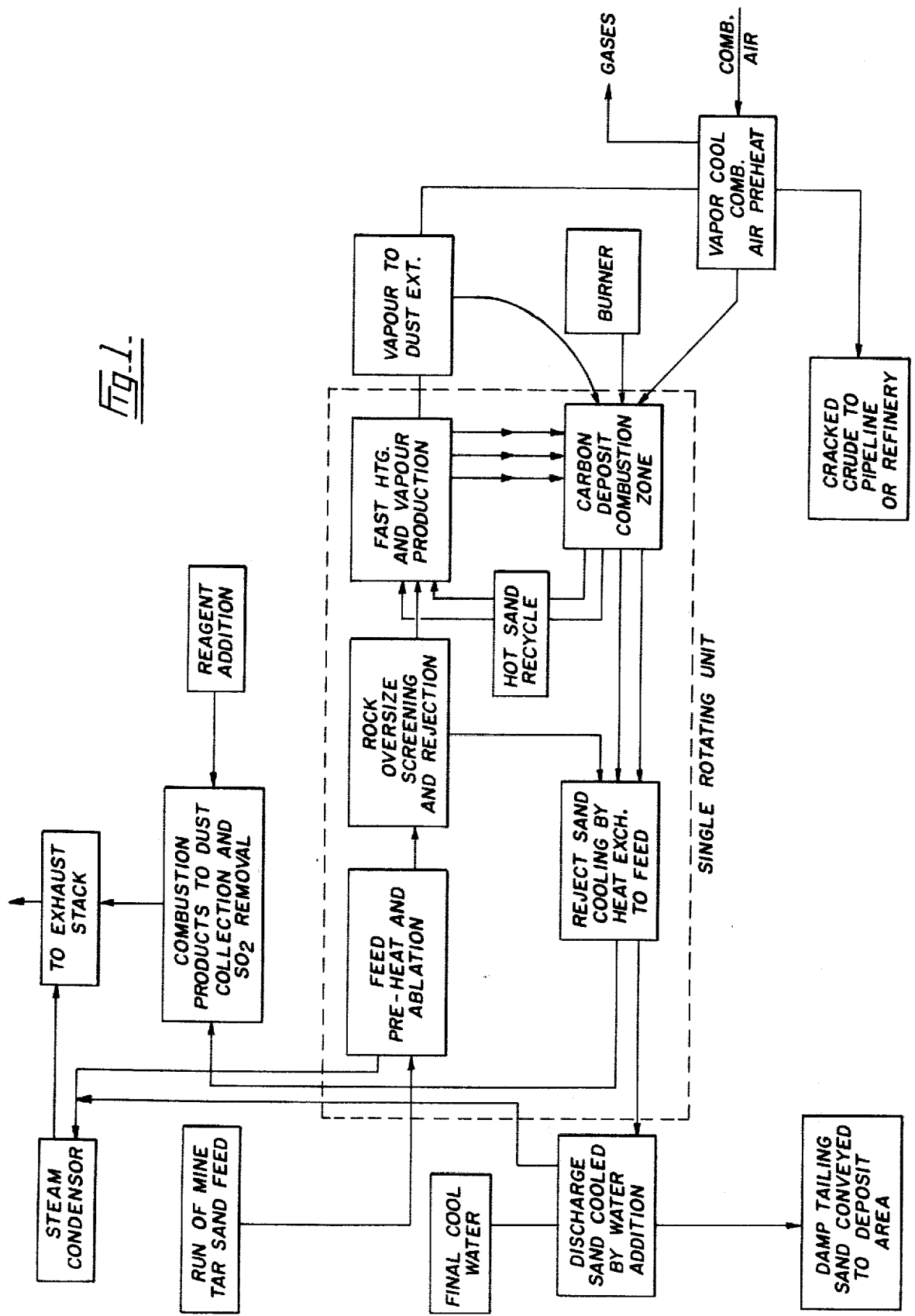

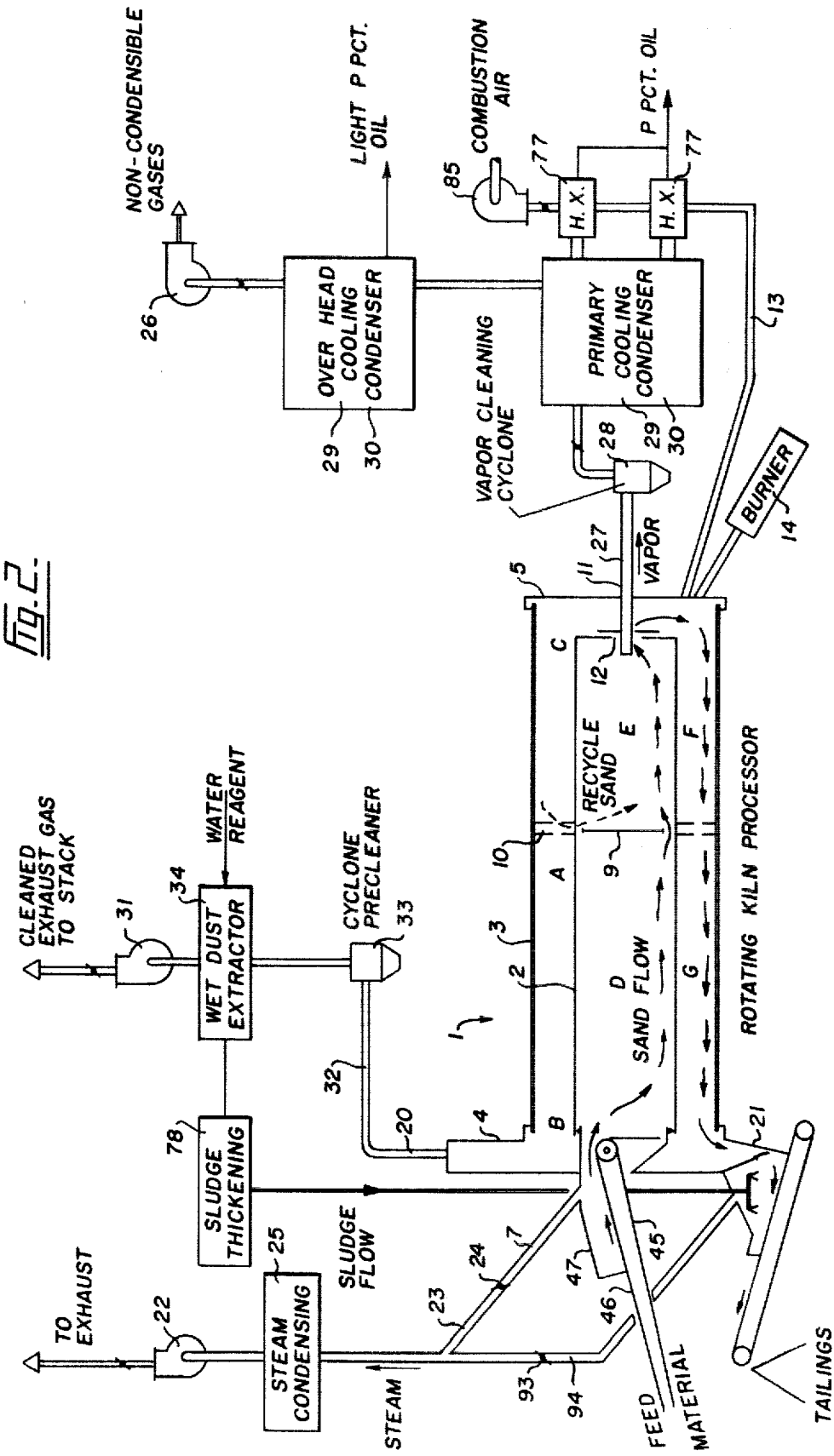

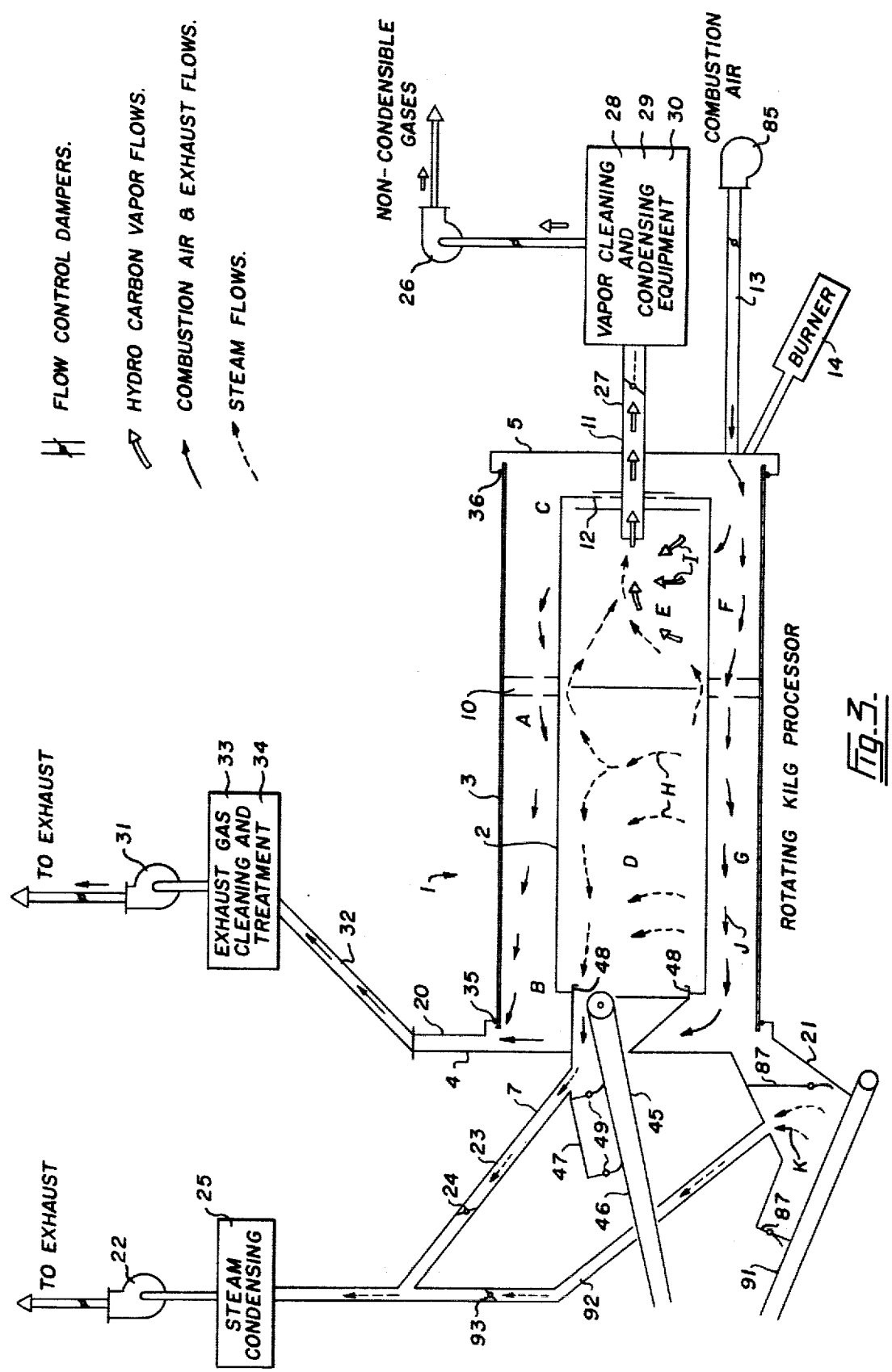

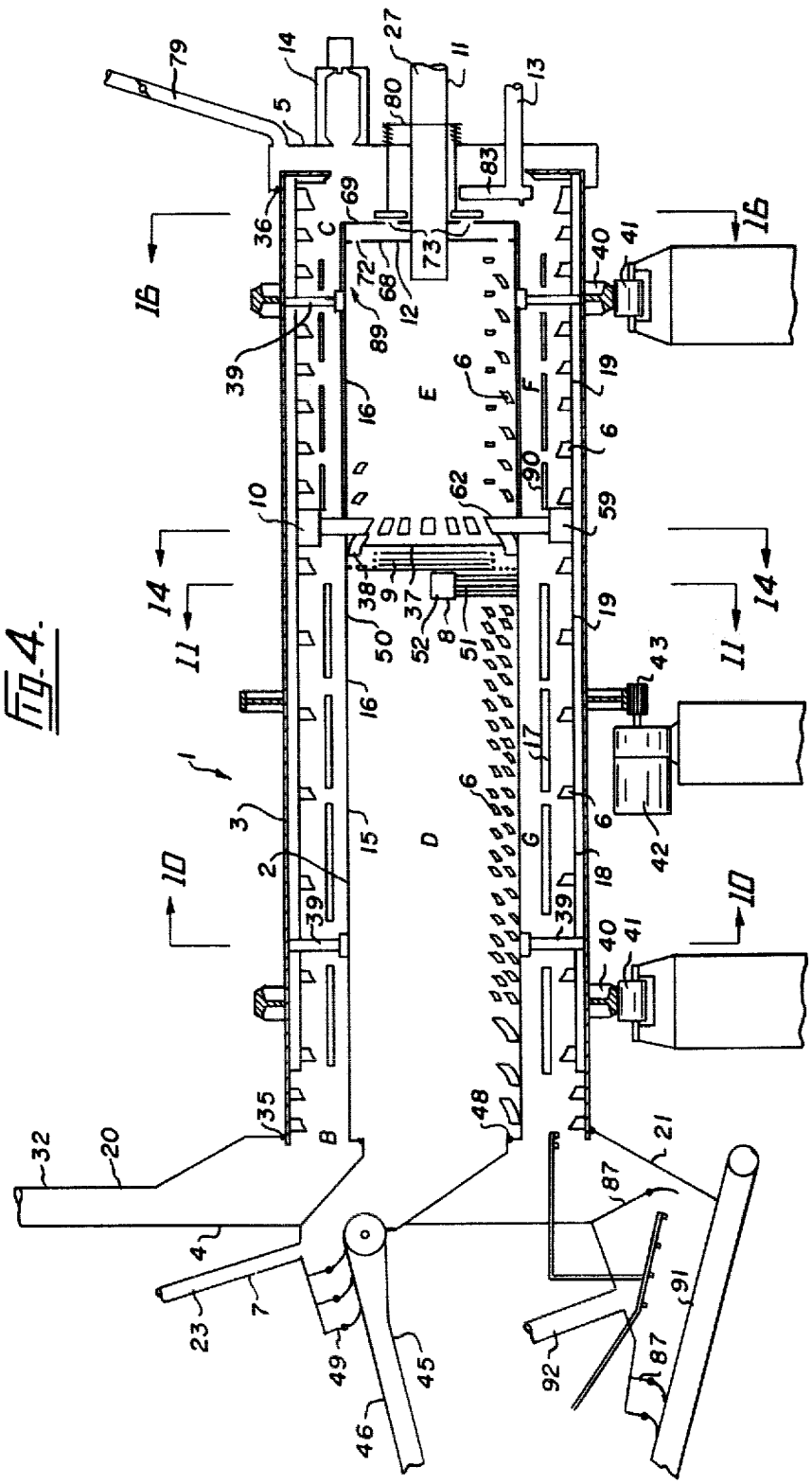

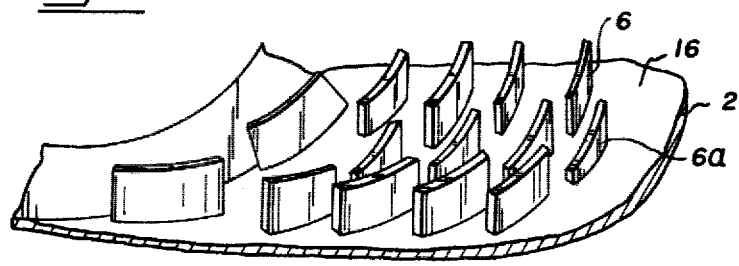
Fig. 5. INNER PREHEAT ELEMENTS.
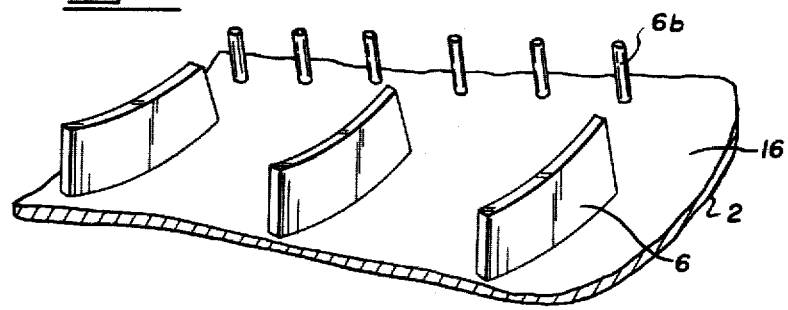
Fig. 6. VAPOR ZONE ELEMENTS.
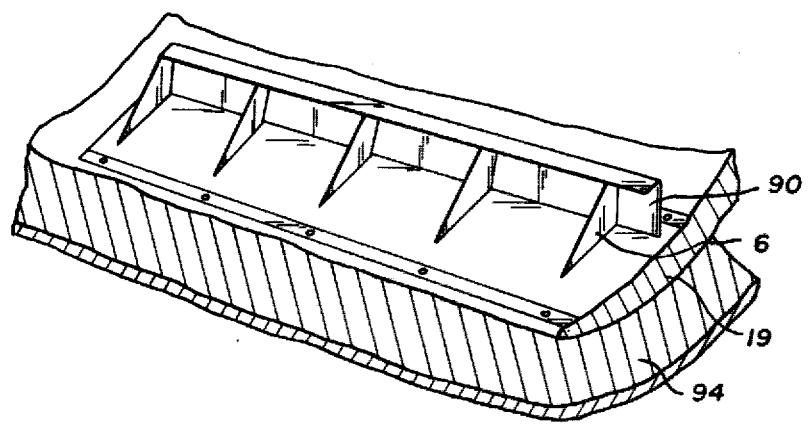
Fig. 7. COMBUSTION ZONE ELEMENTS.
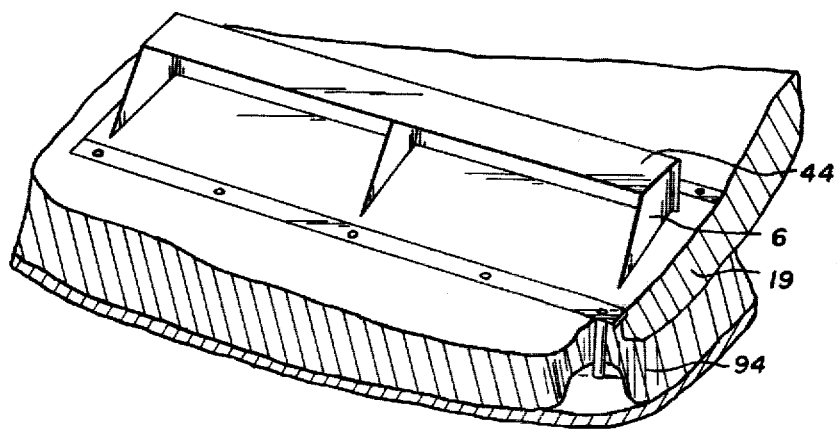
Fig. 8. OUTER PREHEAT ELEMENTS.

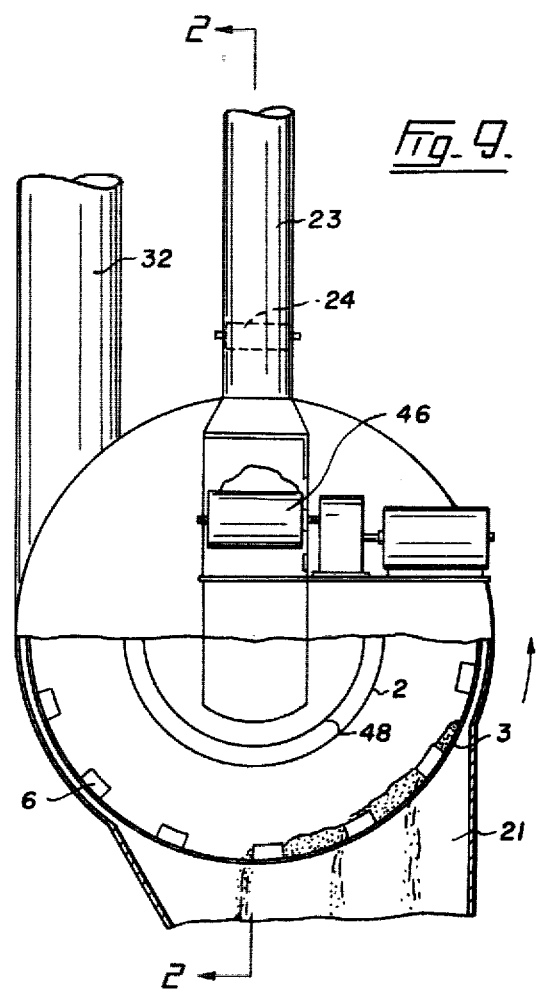
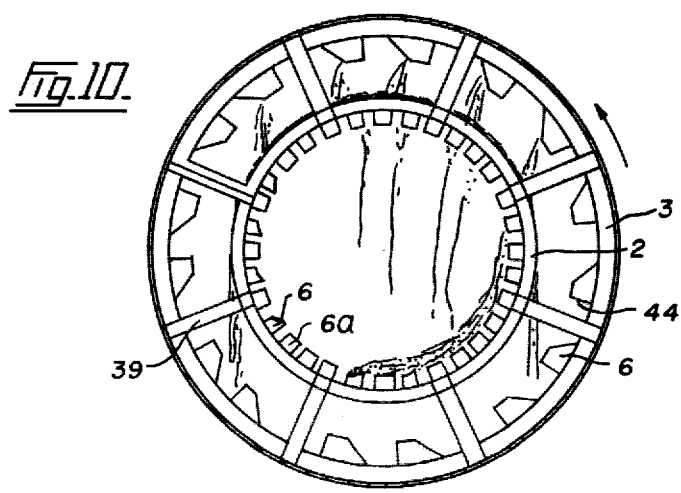

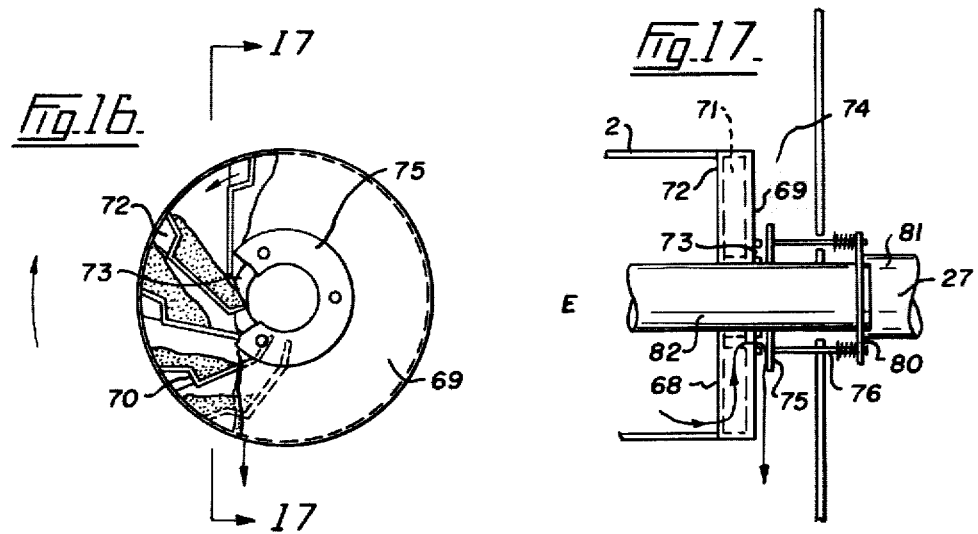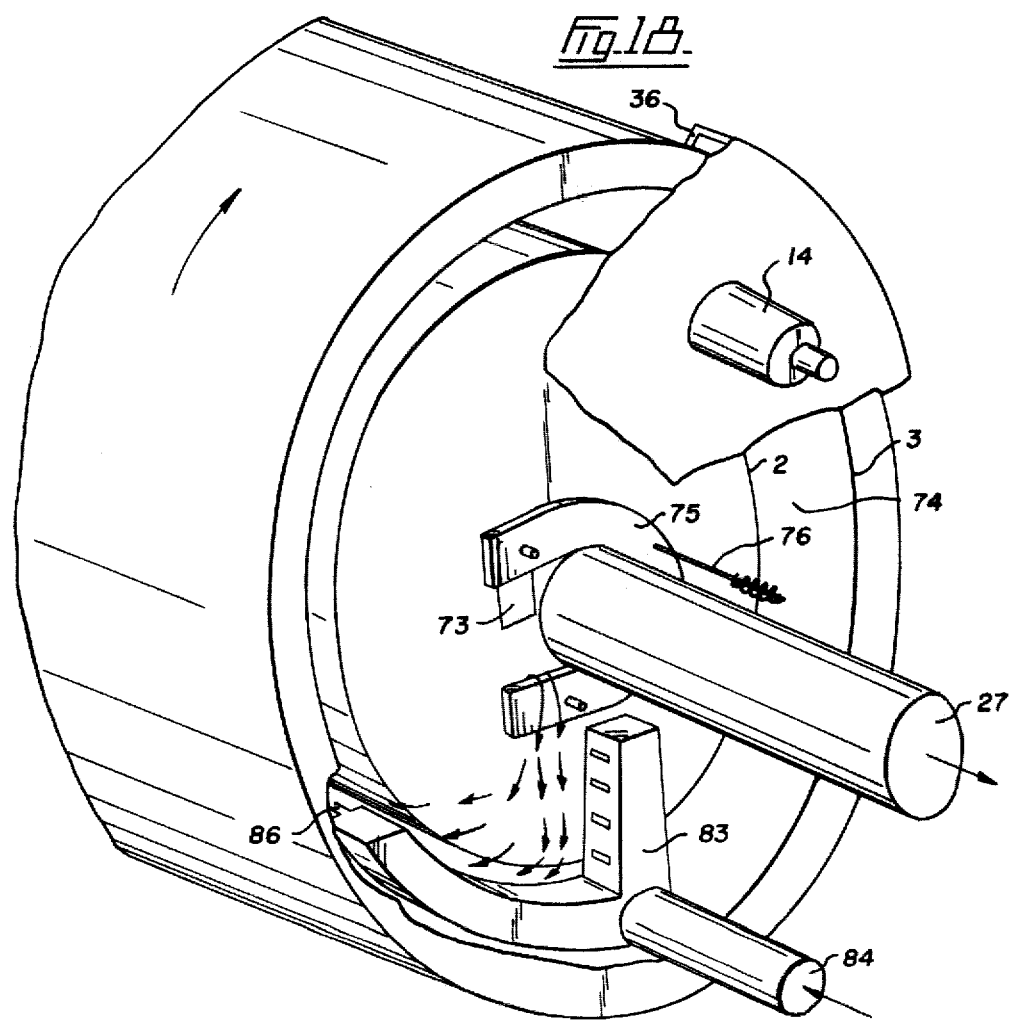

APPARATUS AND PROCESS FOR RECOVERY OF HYDROCARBONS FROM INORGANIC HOST MATERIALS

CROSS-REFERENCE OF THE INVENTION

This is a continuation-in-part of prior co-pending application Ser. No. 034,098, filed Apr. 27, 1979, now abandoned, which is a Continuation of application Ser. No. 828,119, filed Aug. 27, 1977, now abandoned, which is a continuation-in-part of the parent application Ser. No. 603,044, filed Aug. 8, 1975, now abandoned.

FIELD OF THE INVENTION

This invention relates to a dry method and apparatus for recovering hydrocarbons from a material such as oil sand.

BACKGROUND OF THE INVENTION

As is further discussed below, the invention is not limited in application to oil sand; however it has been developed in connection with the treatment of such material and therefore the following disclosure describes it in connection with that particular feedstock.

Whole oil sand is a material whose composition and characteristics have direct influence on the design of apparatus and method for treating it. Its composition includes granular mineral solids, water and bitumen. The granular solids comprise coarse solids (mainly sand having particle sizes in the range 80–200 mesh) and fine solids (mainly clay having particle sizes less than about $-44\mu$). The whole oil sand further comprises rocks, ranging from pebbles to boulders, and cohesive lumps of granular solids. In winter, the whole oil sand, which is mined by huge draglines or rotating bucket wheels, commonly reports in the form of frozen chunks—some weighing in the order of two tons. In summer, the as-mined material reports as a sticky mass which is difficult to screen to remove the oversize rocks and lumps. When used herein, the term "whole oil sand" means this as-mined material, although it may have been subjected to preliminary rough screening or the like to remove easily separable large boulders.

Oil sands are today commercially treated with what is commonly known as the hot water extraction process. This process involves first conditioning the whole oil sand by mixing it with steam and some hot water for a period of time in a horizontal rotating drum. With heat and dilution, the solid and hydrocarbon components of the oil sand separate to an extent which permits oversize material to be removed by screening. The product is then diluted with hot water and introduced into a settling tank. Here the coarse sand settles out and is discarded as an underflow. The bitumen, attached to air bubbles incorporated in the mixture in the conditioning drum, floats as a froth and is recovered. A dragstream—containing mainly water, some non-floatable bitumen, and fine solids—is drawn from the centre of the tank. This dragstream is treated in a sub-aerated flotation cell to produce a contaminated bitumen froth and a watery underflow. The underflows are combined and discarded; the froths are combined, cleaned to remove contanined water and solids, and then upgraded in a conventional refinery on-site operation.

There are presently two commercial plants of this type in operation in Canada. The second-built plant is designed to produce about 125,000 barrels of net synthetic crude per day and its contruction cost, including the mining and upgrading facilities, was in the order of several billions of dollars.

There are a number of disadvantageous features, of interest with respect to this invention, which characterize the hot water extraction process. For example, it uses enormous quantities of water. Since it is intended to produce a million or more barrels of product per day from the Canadian oil sands, the pressure on the finite water supplies in the oil sand area is a serious problem. Secondly, the wet tailings produced have to be retained for years in gigantic diked ponds before the water in them is sufficiently clean to be re-used in the process. This is because the clay particles suspended in the water are very slow to settle out. Thirdly, the need to heat process water and produce steam consumes some of the hydrocarbons produced. Fourthly, there is a need to upgrade the bitumen with an on-site refinery before it can be pumped, due to its high viscosity.

With these disadvantages in mind, it has heretofore been proposed to pyrolyze the oil sand using a solid carrier to provide the heat. More particularly, this "dry" scheme contemplates mixing oil sand with hot recycled sand, thereby effecting heat transfer and vaporizing and cracking bitumen and producing coked sand. The coke on the coked sand is subsequently burned to heat the sand so that it may be recycled to the heat transfer operation.

This dry scheme reduces water consumption and disposal. It has the possibility of yielding higher liquid hydrocarbon recoveries than the hot water process including refining. Furthermore, it will yield a less viscous liquid product which will be more easily pumpable than the hot water process product.

This invention is concerned with a novel dry processor and with the process performed in it.

The present processor has been developed with the following criteria in mind. It should be capable of doing the following:

1. processing whole oil sand without or with minimal prior screening;
2. converting whole oil sand into a form from which oversize rocks may be separated and rejected and then making such a separation;
3. reducing the size of lumps of oil sand so that at least some of them become part of the normally processable feed stream;
4. heating the material in stages so as to vaporize the water and hydrocarbons in different zones, with the result that they may be separately recovered and thus do not contaminate each other to an undesirable extent;
5. vaporizing and cracking hydrocarbons so that they may be withdrawn and collected in a desirable product form;
6. conserving energy by burning coked sand to provide some, if not all, of the heat needed for the process in the form of hot sand, from which heat may be extracted by heat transfer;
7. efficiently recovering heat from recycled hot sand to further conserve energy; and
8. carrying out these operations in a single processor unit which is capable of maintaining substantial segregation of the gaseous atmospheres in the various zones where different operations are simultaneously progressing.

Bennett, in U.S. Pat. No. 3,481,720, describes a dry thermal processor which meets some, but not all, of these objectives. This processor was developed in connection with treating oil shale, but the patent states it has utility for oil sand as well. The Bennett unit comprises rotatable, horizontal, concentrically arranged, spaced inner and outer tubes having first and second ends. The inner tube provides a preheat zone at its first end and a vaporization zone at its second end. The annular space between the tubes is divided into a combustion zone at the second end and a heat-transfer zone at the first end. The feed is pre-crushed and then advanced through the pre-heat, vaporization, combustion and heat-transfer zones sequentially and undergoes different processes as described below. In general, the method embodied in the operation of the unit comprises:

(a) Feeding crushed raw feed stock into the pre-heat zone. Here the feed is heated to about 200°–300° F. by heat exchange, through the inner tube wall, with hot gases associated with hot solids advancing through the heat-transfer zone of the annular space. By preheating the raw feed, contained moisture is converted into steam, which is recovered through a pipe extending into the preheat zone;

(b) Mixing the preheated feed with hot recycled solids in the vaporization zone and effecting heat exchange through solids contact to produce a mixture having a temperature in the order of 900° F. As a result of this operation, contained hydrocarbons are volatilized, some are cracked, and the gaseous products are recovered from the zone through a pipe extending thereinto—also, coked solids are left as a residue;

(c) Transferring the coked solids into the combustion zone and mixing them with injected air to effect combustion of the coke and raise the temperature of the solids to 1400°–1600° F.;

(d) Recycling a portion of the hot solids produced in the combustion zone into the vaporization zone to heat the preheated solids and advancing the balance of the hot solids past the recycle point and through the heat-exchange zone, to heat the wall of the inner tube and thus the solids contained therein in the preheat zone; and (e) Discharging the solids from the first end of the heat-exchange zone to waste.

Bennett teaches the use of augers to advance the solids through the inner tube and back through the annular space. The augers are welded around their inner and outer circumferences to the relevant containing tube. By a combination of these augers and a choking action using feed solids (achieved by varying the pitch of the augers), Bennett segregates the preheat zone gases, the vaporization zone gases and the combustion zone gases from each other.

With respect to the objectives previously set forth, it will be noted that Bennett relies on:

(1) Augers to move the material. This requires that the feed stock be of generally uniform particle size. Bennett achieves this by requiring crushing of the feedstock before it is introduced into the processor;

(2) The augers and solids choking to achieve segregation of the gaseous atmospheres; and (3) The use of gases in the heat-transfer zone to conduct heat from the recycled hot solids in the zone to the wall of the inner tube for conductance through the wall to the solids in the pre-heat zone.

SUMMARY OF THE INVENTION

The present invention provides a dry processor in which features have been combined to enable the unit to successfully process whole oil sand.

Like Bennett's unit, the present processor comprises spaced, substantially horizontal, generally concentric inner and outer tubular members having first and second ends. The members are connected for rotation together and means are provided for rotatably supporting them and sealing the ends of the outer member and the first end of the inner member. Further means are provided for rotating the members. The inner tubular member provides a preheat zone at its first end and a vaporization zone at its seond end. The annular space between the members comprises a combustion zone at its second end and a heat-transfer zone at its first end. Means are provided for feeding whole oil sand into the preheat zone. Means are also provided for removing water vapor from the preheat zone. Further means are provided for advancing oil sand solids through the preheat and vaporization zones and back through the combustion and heat-transfer zones. Means are provided for removing hydrocarbon gases from the vaporization zone. Means are also provided for transferring coked solids from the vaporization zone to the combustion zone, said means cooperating with the coked solids to prevent significant gas movement therethrough between these zones. Further means are provided for introducing oxygen-containing gas into the combustion zone to react with the coke and effect combustion. Means are further provided for removing combustion gases from the annular space. Means are also provided for recycling a portion of the hot solids produced in the combustion zone back into the vaporization zone, said means cooperating with the hot oil sand solids to prevent significant gas movement therethrough between the annular space and the vaporization zone. Further means are provided for removing oil sand solids from the heat-transfer zone for disposal.

However, the invention is characterized by incorporating into this prior combination at least some of the following novel features:

(1) the preheat and vaporization zones are substantially open spaces, as are the combustion and heat-transfer zones;

(2) separate suction means, which may comprise a fan and conduit means, are provided to withdraw gases from each of the preheat, combustion and vaporization zones, with the greatest suction preferably being drawn on the vaporization zone;

(3) means are provided in the preheat zone for advancing, lifting and mixing the whole oil sand solids by a cascading action to effect size reduction of the oil sand lumps;

(4) means are also provided, at the second end of the preheat zone, for separating oversize solids from the oil sand being treated and removing them from the zone, preferably for discharge into the heat-transfer zone whereby they may subsequently be carried to waste;

(5) means are also provided, downstream of the rock removal means and between the preheat and vaporization zones for restricting the movement of gases between the zones while permitting derocked oil sand to be moved therebetween;

(6) means are carried by the outer tubular member in the heat-transfer zone for lifting hot solids advancing from the combustion zone and dropping them onto the outer surface of the wall of the preheat portion of the inner tubular member to effect heat transfer at a desirable rate through the wall, with the result that heat is efficiently transferred from the hot solids to oil sand proceeding through the preheat zone; and (7) means are provided at the first end of the outer tubular member for cooling and dampening the hot sand solids as they issue from the heat-exchange zone, which means may be located in the annular space, exterior of the processor or in both of these locations.

The processor as described operates in the following manner.

Whole oil sand (from which easily separated large boulders and the like may have been removed by a preliminary screening operation) is introduced into the preheat zone of the rotating inner tubular member. Here the oil sand is heated, preferably to a temperature in the order of 450° F., while it is cascaded due to the rotation of the containing wall. Substantially all of the contained water is vaporized and withdrawn off by means such as a suction fan and conduit. At the same time, lumps of cohesive oil sand are worked and reduced in size by the combination of bitumen viscosity reduction and thawing of frozen lumps due to heating, and cascading, arising from rotation of the inner member. Upon reduction of the bitumen viscosity, oversize rocks and remaining lumps of oil sand may now be separated from the preheated feed by a screening operation, which is conducted at the second end of the preheat zone. These rocks are removed to reduce damage to the processor seals and to avoid plugging of downstream components. Thus, in summary, preheating of sand and bitumen, water vaporization and removal, ablation of lumps, and oversize separation and rejection are effected in the preheat zone.

The remaining oil sand is then advanced through the aforementioned means which permit solids movement from the preheat zone into the vaporization zone, but which restrict gas movement therebetween. Such means may comprise a wall extending transversely across the bore of the inner member at the interface of the preheat and vaporization zones, said wall being apertured around its periphery. The solids and gases both can move through these apertures, but the gas movement is somewhat restricted, relative to what it would be if there were no wall in place. The reason for restricting the gas flow is clarified below.

On entering the vaporization zone, the preheated oil sand (typically having a temperature in the order of 450° F.) is mixed with recycled hot solids from the combustion zone (typically having a temperature in the order of 1100°–1300° F.) to produce a product typically having a temperature in the order of 900°–1050° F. Mixing is obtained inthe vaporization zone by a gentle mixing or cascading action produced on the solids by rotation of the inner member in cooperation with the advance elements. As a result of heating of the oil sand, the bitumen volatiles are vaporized, some cracking takes place, and coked sand is left as the solids product. The gaseous hydrocarbons are withdrawn from the vaporization zone by suitable means, such as a fan and conduit. The major portion of these hydrocarbons may subsequently be condensed in suitable apparatus to yield liquid product.

Coked solids are transferred from the vaporization zone into the combustion zone. Here an oxygen-containing gas, such as air, is introduced and thoroughly mixed with the coked solids to support combustion. Additional heat may be introduced with a burner. As a result, the solids are raised in temperature, for example to 1100° F.–1300° F.

The hot solids from the combustion zone are then advanced through the annular space. A part of these solids is recycled into the vaporization zone. The balance of the solids enters the heat-transfer zone, where it is lifted and dropped onto the surface of the pre-heat zone section of the inner member wall. This solid-to-solid contact results in efficient heat transfer to the wall. The transferred heat is conducted through the wall to provide the heat requirements for raising the temperature of the oil sand passing through the preheat zone.

Means, such as a fan and conduit, are used to withdraw combustion gases from the annular space.

The extent of suction drawn separately on each of the annular space, the pre-heat zone, and the vaporization zone is preferably controlled to maintain slight pressure differentials between them, thereby ensuring that a small amount of outside air is drawn through the sealing means into the annular space, a small amount of the gases in the annular zone is drawn into the preheat zone, and a restricted amount of the gases in the preheat zone is drawn into the vaporization zone through the apertures of the restrictive wall. In this manner, migration of hydrocarbon gases into the pre-heat zone and the annular space is substantially prevented. As a result, the preheat zone may be open to accommodate whole oil sand feed; the heat-transfer zone may be open so that lifters may be incorporated therein to effect solid-to-solid contact of hot sand with the inner member wall; and the vaporization zone may be open so that adequate mixing by cascading is obtained therein to ensure efficient heat transfer.

Broadly stated, the invention comprises an apparatus for recovering hydrocarbons from whole oil sand containing sand and clay solids in discrete and lump forms, water, bitumen and oversize rocks. Said apparatus comprises spaced, substantially horizontal generally concentric inner and outer tubular members having first and second ends, said members being connected to rotate together, said inner member forming substantially open pre-heat and vaporization zones at its first and second ends respectively, said members combining to form a substantially open annular space between them having a combustion zone at the second end thereof and a heat transfer zone at the first end thereof; means for rotatably supporting the members; means for sealing the ends of the outer member and the first end of the inner member; means for rotating the members; means for feeding whole oil sand into the preheat zone; means for advancing oil sand solids along a path extending through the preheat and vaporization zones and back through the combustion and heat-transfer zones; said outer member carrying means in the heat-transfer zone for lifting hot sand solids being advanced therethrough and dropping them onto at least part of that section of the wall of the inner member which forms the preheat zone to cause heat to be transferred through such wall section, whereby water in the whole oil sand may be vaporized in the preheat zone and whereby lumps of oil sand may be reduced in size by a combination of heating and cascading effected by rotation of the inner member; first means for removing water vapor from the preheat zone; means for separating oversize solids from the whole oil sand being advanced through the preheat zone and transferring them into the annular space for disposal; means carried by the inner member for restricting gas movement between the preheat and vaporization zones while permitting remaining preheated oil sand to be advanced from the preheat zone into the vaporization zone; means for recycling hot sand solids, being advanced through the annular space, into the first end of the vaporization zone for mixing with oil sand issuing from the preheat zone to raise its temperature and thereby vaporize and crack hydrocarbons and produce coked solids, said means cooperating with the hot sand solids to prevent significant gas movement therethrough between the annular space and the vaporization zone; second means for removing gases from the vaporization zone for recovery; means for transferring coked solids from the vaporization zone to the combustion zone, said means cooperating with the coked solids to prevent significant gas movement therethrough between said zones; means for introducing oxygen-containing gas into the combustion zone for burning coke to produce hot sand solids; third means for drawing combustion gas from the annular space for disposal; and means for removing sand solids from the heat transfer zone for disposal.

In a preferred aspect, the invention broadly comprises means for controlling said first, second and third means whereby the pressure in the vaporization zone is less than that in the preheat zone and annular space.

DESCRIPTION OF THE DRAWINGS

FIG. 1 is a flow sheet of the process and apparatus of the present invention;

FIG. 2 is a schematic drawing of the processor illustrating the flow of solids therethrough;

FIG. 3 is a schematic drawing of the processor illustrating the preferred flow and removal of the gases produced;

FIG. 4 is a sectional view, taken along line 2—2 of FIG. 9, showing the main features of the processor;

FIG. 5 is a fragmentary perspective view of the closely packed advance plates and keying elements in the preheat zone;

FIG. 6 is a fragmentary perspective view of the advance plates and mixing spikes in the vaporization zone;

FIG. 7 is a fragmentary perspective view of the flat-face lifters in association with the advance elements used in the combustion zone;

FIG. 8 is a fragmentary perspective view of the cup-faced lifters and advance elements used in the heat-exchange zone;

FIG. 9 is an end on view, partially in section, of the feed end structure of the processor;

FIG. 10 is a cross sectional view taken along line 10—10 of FIG. 4, of the preheat and heat-transfer zones;

FIG. 16 is a cross sectional view taken along line 16—16 of FIG. 4, showing the means for transferring coked solids from the vaporization zone to the combustion zone; a portion of the end plate is cut away for further clarification;

FIG. 17 is a cross sectional view, taken along line 17—17 of FIG. 16, showing the product end seal; and FIG. 18 is a fragmentary perspective view of the product end seal.

DESCRIPTION OF THE PREFERRED EMBODIMENT

In General

Figure 11:
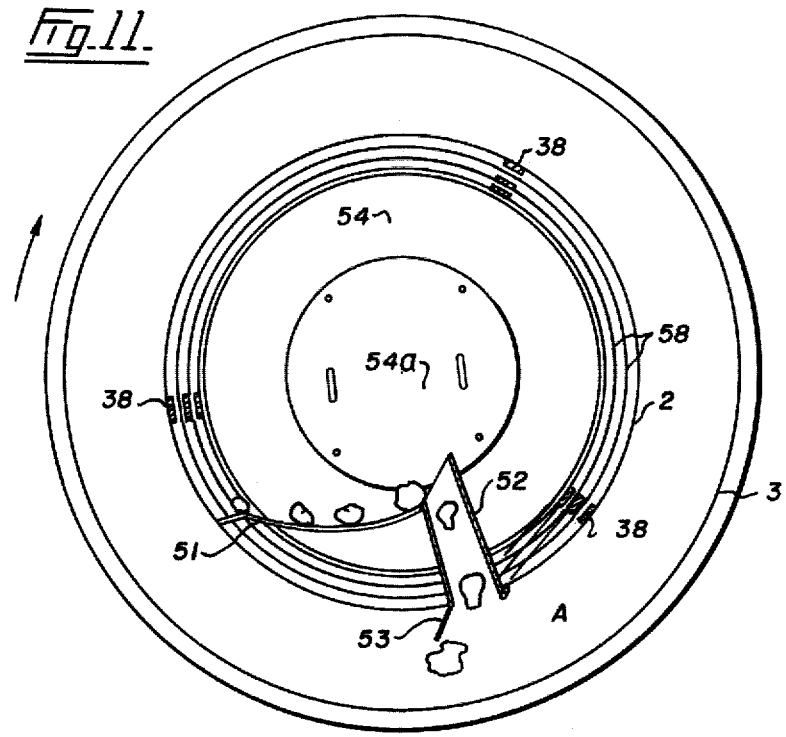
FIG. 11 is a cross sectional view, taken along line 11—11 of FIG. 4, showing the oversize removal means.

The apparatus of the present invention is a dry thermal processor 1 for producing and separating, from hydrocarbon-containing solids, a hydrocarbon product stream and a solids waste stream. A schematic drawing of the processor in flow sheet form is shown in FIG. 1.

The oil sand feed material is introduced into the processor 1 as whole oil sand. The term whole oil sand refers to the run-of-the-mine oil sand material, such as that obtained from the Athabasca oil sand deposits of Alberta. The material comprises coarse sand, fine clay, bitumen and water. It usually includes a mixture of cohesive lumps, often in a frozen condition, and discrete particles of oil sand. Also included in the whole oil sand are rocks and other mine site debris, some of which are embedded in the cohesive lumps of oil sand.

With reference to FIG. 2, the processor 1 is seen to comprise radially spaced, concentric, substantially horizontal inner and outer tubular members 2,3. The tubular members 2, 3 are generally coextensive and rigidly interconnected for rotation together as a single unit about their common long axis. An annular space A is formed between the walls of the members. Each of the tubular members 2,3 have first ends at B and second ends at C respectively. The inner tubular member 2 provides a preheat zone D at its first end and a vaporization zone E at its second end. The annular space A is divided into a combustion zone F at its second end and a heat-transfer zone G at its first end. It should be understood that the terms first and second ends are used loosely to refer to adjoining expanses within wall portions of the tubular members as defined by the side and end walls of the tubular members 2, 3.

The outer tubular member 3 extends between a stationary feed end structure 4 and a stationary product end structure 5. The feed end structure 4 provides means for sealing the first ends of the inner and outer tubular members 2, 3 while the product end structure 5 provides means for sealing the second end of the outer tubular member 3.

Advancing means 6 are affixed along the inner surfaces of the tubular members 2,3 to advance the solids therein as the tubular members are rotated. In the inner tubular member 2, the solids are advanced toward the product end structure 5; in the annular space A, the solids are advanced back toward the feed end structure 4.

Whole oil sand solids are introduced through the feed end structure 4 into the preheat zone D. As the feed material is advanced through the preheat zone D, it is progressively heated by heat transferred through the wall of the inner tubular member 2. This heat is obtained from hot solids in the surrounding heat-transfer zone G, which solids are lifted and dropped onto the inner tubular member 2. The temperature in the preheat zone is controlled to a level which is sufficient to remove substantially all of the water associated with the feed material without substantial vaporization of the bitumen component of the oil sand material. In the preheat zone D, the solids are cascaded as the containing tubular member is rotated. This cascading action arises from the closely packed advance means 6 and keying element 6a provided in the preheat zone. This preheating, together with the cascading action, reduces the particle size of the lumps of oil sand material and releases rocks and other debris from these lumps for their subsequent removal. The water vapor and steam from the preheat zone are withdrawn by first gas removal means 7.

Also provided in the preheat zone D is means 8 for separating and transferring oversize solids from the preheated and ablated feed material. This oversize material, which includes rocks, lumps of oil sand material resistive to particle size reduction and other large debris, is dropped into the annular space A for disposal.

Means 9 are provided between the preheat and vaporization zones D, E for restricting gas movement between these zones while permitting the remaining preheated oil sands to be advanced therethrough.

In the vaporization zone E, the remaining preheated solids are mixed with hot recycle solids recycled from the combustion zone F through recycle means 10. The temperature of the preheated solids is thereby rapidly raised to a level sufficient to thermally crack and vaporize a portion of the bitumen component. The hydrocarbon vapors produced are removed as a product by second gas removal means 11 provided at the second end of the inner tubular member 2.

As a result of thermally cracking and vaporizing hydrocarbons in the oil sand material, coked solids particles are produced. These coked solids comprise a coke residue in association with the remaining sand. At the second end of the inner tubular member 2, means 12 are provided for transferring the coked solids from the vaporization zone E into the combustion zone F. These means 12 cooperate with the coked solids to prevent any significant gas movement between these zones E, F.

Means 13 are provided for introducing an oxygen-containing gas, such as air, into the combustion zone F for burning at least part of the coke on the coked solids to produce hot sand solids. This combustion, together with any supplemental heat which may be required, raises the temperature of the sand solids to a level sufficient to cause vaporization in the vaporization zone when such hot solids are recycled. Supplemental heat can be provided by introducing heated air from a burner 14 into the annular space A.

As the combustion-heated solids are advanced toward the feed end structure 4, a portion of such hot solids is recycled to the vaporization zone E as described previously. The remaining combustion-heated solids are advanced back through the heat-transfer zone G.

In the heat-transfer zone G, the hot combustion-heated solids are lifted and dropped onto that section 15 of the wall 16 of the inner tubular member 2, which section forms the preheat zone D. For this purpose, lifting means 17 are provided along at least part of the inner surface of that section 18 of the wall 19 of the outer tubular member 3, which section forms the heat-transfer zone G. Waste heat which would otherwise be lost is thus recovered and transferred to the solids in the preheat zone D.

Combustion produced gases are withdrawn from the annular space A by gas removal means 20 at the first end of the outer tubular member 3.

The sand solids completing travel through the heat transfer zone G are removed from the annular space A by the removal means indicated at 21. The hot sands are thereafter cooled and conveyed to a deposit area.

Segregating and Removing the Gases Produced

The gases and vapors produced as abovedescribed are of three types, namely, the water vapor produced in the preheat zone D, the hydrocarbon gases and vapors produced in the vaporization zone E, and the combustion gases produced in the combustion zone F. For purposes of safety and economics of recovery, these gaseous atmospheres are preferably substantially segregated from each other and withdrawn from the tubular members 2, 3 by separate gas removal means.

As shown in FIGS. 1, 2 and 3, the water vapor and steam stream H, produced in the vaporization zone E, is withdrawn by a suction fan 22 into the feed end structure 4. The water vapor and steam stream H is drawn into the conduit 23 past a damper 24 and into a steam condensor 25 before being vented to the atmosphere.

The hydrocarbon gases and vapors stream I, produced in the vaporization zone E, is drawn by a suction fan 26 toward the product end structure 5. These gases and vapors are withdrawn through the conduit 27 into one or more dust extractors 28, to remove the fine particulates therefrom. A cooler 29 and condenser 30 are provided to condense a portion of the vapors into a liquid product stream, which can be pumped to a remote or adjacent processing facility. The non-condensible hydrocarbon vapors are compressed and further cooled before being conveyed to a processing facility.

A combustion gas stream J is withdrawn from the annular space A into the feed end structure 4 by a suction fan 31. The gases are drawn through a conduit 32 through a cyclone 33 and wet scrubber-type dust extractor 34 before being vented to the atmosphere through an exhaust stack (not shown). The scrubber-type extractor 34 is operative to remove the fine particulates carried with the gases. Preferably the water in the extractor 34 has a high content of calcium ions. The dissolved calcium sulphate oxidizes to form water-insoluble calcium sulphate. The sludge removed from the dust extractor 34 is passed through sludge thickener 78 and disposed of with the tailings solids.

To control the movement of the gases in the tubular members 2,3, sealing means are provided, which means are not absolute seals but permit a net movement of gases in a manner to be hereinafter described. It is difficult to attain absolute seals when dealing with the rotating tubular members 2,3 operting at high temperatures.

The feed end and product end structures 4,5, as previously mentioned, provide end seals 35, 36 for the first and second ends B,C of the outer tubular member 3. These seals 35, 36 are constructed so as to permit a slight inward leakage of air into the annular space A. The pressure within the tubular members 2,3 is maintained at slightly less than atmospheric pressure, or in other words, negative relative to atmospheric pressure. This negative pressure is drawn by the suction fan 31 removing the combustion gases. This pressure differential between the atmosphere and the annular space A prevents combustion gases from escaping into the atmosphere. The pressure differential is small, maintaining a pressure of about −0.1" W.G. in the annular space A.

Most preferably, slight pressure differentials are maintained between the annular space A and zones D and E, to prevent hydrocarbon vapors from leaking into either the preheat zone D or combustion zone F. To that end, the pressure in the vaporization zone E, as drawn by the suction fan 26, is maintained less than the pressures in the preheat zone D and the annular space A. The pressure in the vaporization zone E is typically kept at about −0.2″ W.G. The pressure in the preheat zone D is typically kept at about −12″ W.G. And, as previously stated, the pressure in the annular space A is typically kept at about −0.1″ W.G. Additionally, means 9 are provided in the inner tubular member 2 intermediate the preheat and vaporization zones D, E for restricting gas movement therebetween. Briefly, these means 9 comprise a solid circular partition wall 37 having perforations 38 around its periphery to permit the tar sand solids to be passed therethrough while restricting gas movement. By "restricting" is meant that the gas movement is less than would be the case if the gases were permitted to freely diffuse between the zones.

By maintaining these pressure differentials, the net movement of gases is such that a small amount of outside air is drawn into the annular space A, a small amount of the gases in the annular space A is drawn into the preheat zone D, and a small amount of gas from the preheat zone D is drawn into the vaporization zone E. In this manner, significant loss of the product hydrocarbon gases to the preheat zone D and annular space A is prevented, to thereby maximize recovery and minimize the possibility of creating explosive gaseous mixtures.

Other net results of this method of segregating the gases are that, with the elimination of absolute seals, the preheat zone D is open to accommodate whole oil sand feed, the heat-transfer zone G is open to accommodate lifting means for efficient heat transfer, and the vaporization zone E is open to achieve adequate mixing by gentle cascading of the hot recycle sands and the preheated solids.

It should be pointed out that the recycle means 10, to be discussed more fully hereinafter, cooperate with the hot oil sand solids being transferred therein (from the combustion zone F to the vaporization zone E) to prevent significant gas movement between these zones. Also, the means 12 for transferring coked solids from the vaporization zone E to the combustion zone F cooperate with said coked solids to prevent significant gas movement between these zones. These means however do not form absolute seals, thereby permitting the desired net movement of gases as discussed above.

If desired, a considerable portion of the steam and water vapor produced in the preheat zone D may be drawn through the vaporization zone E by controlling the suction drawn on these two zones. The water vapor may thereby be used as a stripping agent in the thermal cracking of the hydrocarbons in the vaporization zone.

As shown in FIG. 4, an emergency gas removal conduit 79 is provided at the second end of the outer tubular member 3 to remove gases from the processor 1 in the event of an emergency shut-down.

The Inner and Outer Tubular Members

The rotating apparatus of the present invention includes a horizontally disposed inner tubular member 2 having first and second ends and a horizontally disposed outer tubular member 3 having first and second ends. The tubular members 2, 3 may be constructed from fabricated or cast metal cylinders. The outer tubular member 3 is generally coextensive with the inner tubular member 2 and is radially spaced therefrom. The tubular members are rigidly connected together by suitable means 39 for concurrent rotation about their common long axes.

The outer tubular member 2 is provided with one or more riding rings 40 fixed around its outer circumference. The riding rings 40 rest on rollers 41. An electrical motor 42 or other suitable power source is used to impart rotary motion to the apparatus through a ring gear 43 affixed to the outer tubular member 3. The rate of rotation is variable to control the movement of the feed material being advanced through the apparatus.

To support the inner tubular member 3 within the outer tubular member 2, a series of radially extending braces 39 are bolted between them. The braces 39 are enclosed in insulative material, which in turn is surrounded with suitable abrasive resistive material (not shown). The insulation is included to isolate the braces from the high temperatures in the apparatus and to reduce the dimension changes caused by temperature fluctuations.

The outer tubular member 3 is provided with an outer lining 94 constructed of a refractory material with a coarse grog to minimize heat loss from the apparatus. Along the length of the combustion zone F, the outer surface of the inner tubular member 2 may be lined with a refractory material (not shown) to prevent the inner vaporization zone E from being overheated. This lining also serves to protect the outer surface of the inner tubular member 2 from abrasive or oxidative damage.

Advancing means 6 are provided along the inner surfaces of the inner and outer tubular members 2,3 to move the solids therealong as the members are rotated. Such advancing means 6, may be metal plates inclined relative to the long axes of the tubular members 2, 3. Counterclockwise rotation of the tubular members 2, 3 as viewed from the feed end causes advancement of the solids in the inner tubular member 2 from the first end toward the second end thereof and solids in the annular space A from the second end toward the first end thereof. The degree to which the advance plates 6 are inclined together with the number and spacing of the plates are varied to control the speed at which the solids are moved through the apparatus. Also provided in the preheat zone are keying elements 6a which comprise metal plates closely packed with the advance plates 6. The keying elements 6a promote lifting and mixing of the oil sand solids. The advance plates 6 and keying elements 6a are bolted to the wall 16 of the inner member 2 and, being of metal, aid in the heat transfer through the wall 16. At the entrances to the preheat, vaporization and combustion zones D,E,F, the advance plates 6 are arranged to move the solids quickly into the zone in question to prevent build-up of the solids. Further into these zones, the advance plates 6 are angled to cause slower movement of the solids. In the preheat zone D, the advance plates 6 are closely packed and inclined at a steep angle. Together with the keying elements 6a, the advance plates 6 provide a cascading action to the feed material as the tubular members 2,3 are rotated, which action aids in reducing the particle size of the feed material.

In the vaporization zone, the combination of the advance plates 6 and mixing spikes 6b create a gentle mixing and cascading action to the oil sand solids.

Lifting means 17 are provided in the heat-transfer zone G to lift and drop hot sand solids onto the outer surface of the inner tubular member 2. These lifting means 17 comprise cup-faced lifters 44, as detailed in FIG. 7, bolted to the side wall 19 of the outer tubular member 3. These cup-faced lifters 44 are operative to lift and drop the hot solids over the top of the rotating inner tubular member 2 as the tubular members rotate.

Similar lifting means of smaller lifting capacity may be used in the preheat and combustion zones D, F if desired.

The Feed End Structure

With reference to FIGS. 2 and 9, the feed end structure 4 is shown to include means 45 for feeding whole oil sand solids into the preheat zone D. The feeding means 45 includes a conveyor assembly 46 which drops the whole oil sand solids into an enclosed feed chute 47 opening into the first end of the inner tubular member 2.

A ring seal 48 is provided between the feed chute 47 and the inner tubular member 2 to form a gas seal therebetween. An air lock member 49 is provided to permit the oil sand solids to enter the inner tubular member 2 without significant gas movement. The ring seal 48 cooperates with the enclosed chute 47 and the air lock member 49 to prevent any significant quantities of external air from being drawn into the inner tubular member, thereby forming means for sealing the first end of the inner tube.

Oversize Solids Removal

Oversize feed material solids, which include rocks, large lumps of oil sand or other debris, are transferred from the inner tubular member 2 to the outer tubular member 3 at the second end 50 of the preheat zone D. To that end, curved metal bars 51 having one end affixed to the walls 16 of the inner tube 2 and the other end affixed to a bypass chute 52 are provided. The curved bars 51 are spaced from each other to form a screen throughwhich the de-rocked feed material may pass as the inner tube 2 rotates. The oversize particles, larger than the spacing of the bars 51, roll along the bars into the bypass chute 52. The bypass chute 52 opens into the annular space A. A door 53 is provided on the bypass chute 52 which is spring-biased or cam operated to a normally closed position. On opening the door 53, the oversize solids are transferred directly into the annular space A for disposal. The door 53 minimizes the transfer of gases between the two tubular members 2, 3.

The Partition Wall

Figure 12:
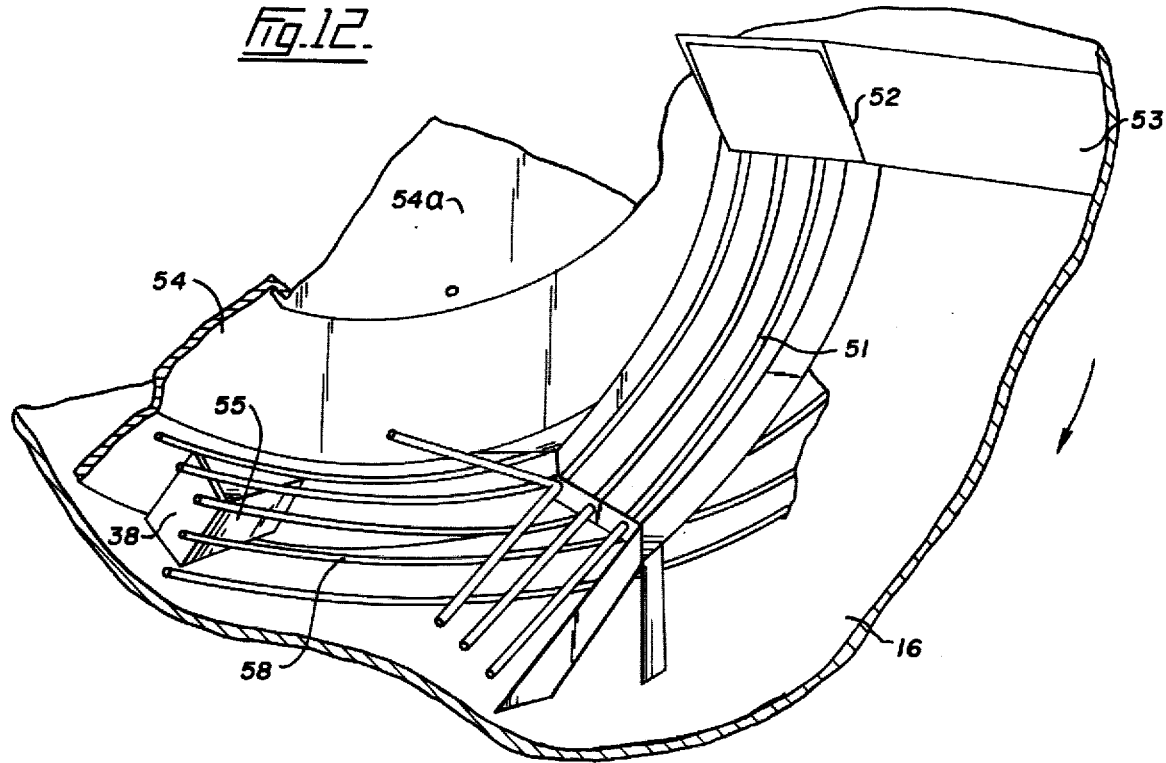
FIG. 12 is a fragmentary perspective view of the oversize removal means and the partition wall.
Figure 13:
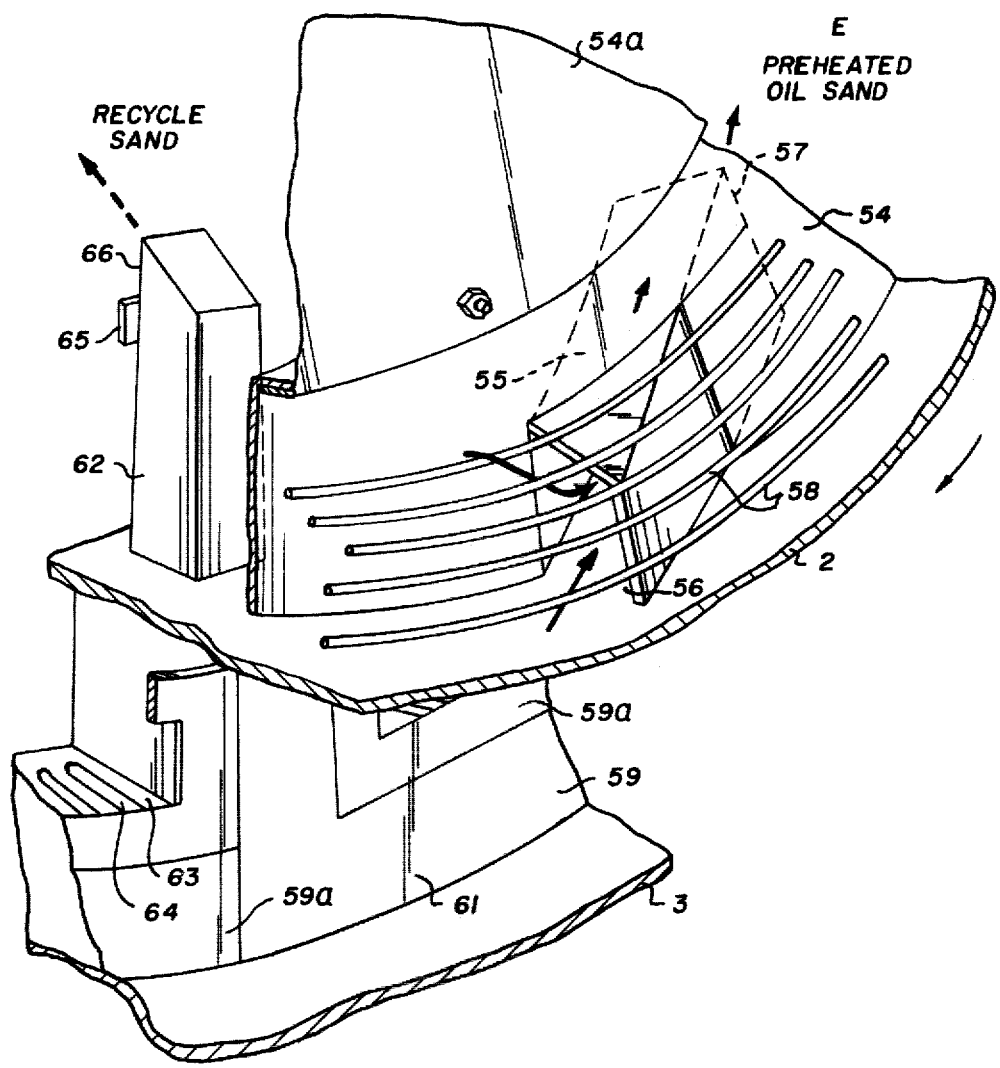
FIG. 13 is a fragmentary perspective view of the partition wall and the recycle means.
Figure 14:
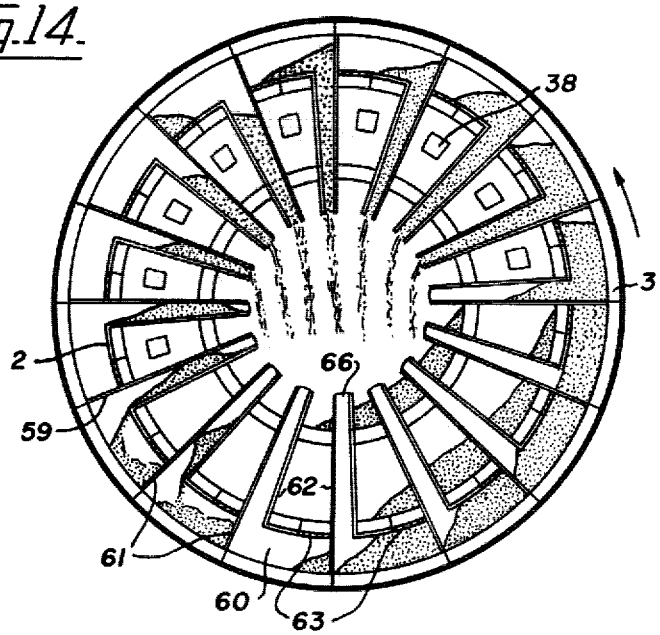
FIG. 14 is a cross sectional view, taken along line 14—14 of FIG. 4, showing the recycle means.

The means 9 for restricting gas movement between the preheat and vaporization zones D, E, as shown in FIGS. 4, 13 and 14, comprises a perforated wall member 37 extending across the inner tubular member between the two zones and positioned downstream of the oversize removal means. The wall member 37 comprises a solid circular plate 54 blocking the central portion of the inner tube 2. A plurality of curved tubular members 55 are affixed to the wall 16 of the inner member 2 through the plate 54. The tubular members provide openings 38 through the plate 54. The tubular members have open ended first and second ends, 56, 57, the first end 56 opening into the preheat zone D and the second end 57 opening into the vaporiation zone E. A plurality of circular spaced bars 58 are provided over the openings 38. The bars 58 screen the oil sand material entering the tubular members 55 to prevent oversize material from blocking the openings or from being transferred into the vaporization zone D. The bars 58 are spaced in an L-shaped configuration over the first ends 56 of the tubular members 55. This configuration is shown clearly in FIGS. 12 and 13. The tubular members 55 are oriented so as to scoop the preheated oil sands thereinto on rotation of the inner tubular member 2. On further rotation, the oil sand falls therethrough into the vaporization zone. The number and size of openings provided is determined by quantity of sand to be passed and the degree of gas control needed.

The ends of the tubular members 56, 57 are the only openings between the preheat and vaporization zones D, E. Since the tubular members 55 are at least partially full of tar sand solids while the processor 1 is rotated, the sands cooperate with the perforated wall 37 to restrict gas movement between the two zones D, E.

Preferably, a removable access door 54a is provided in the plate 54 to allow one access to the vaporization zone E for repairs or the like during a shut-down period.

Figure 15:
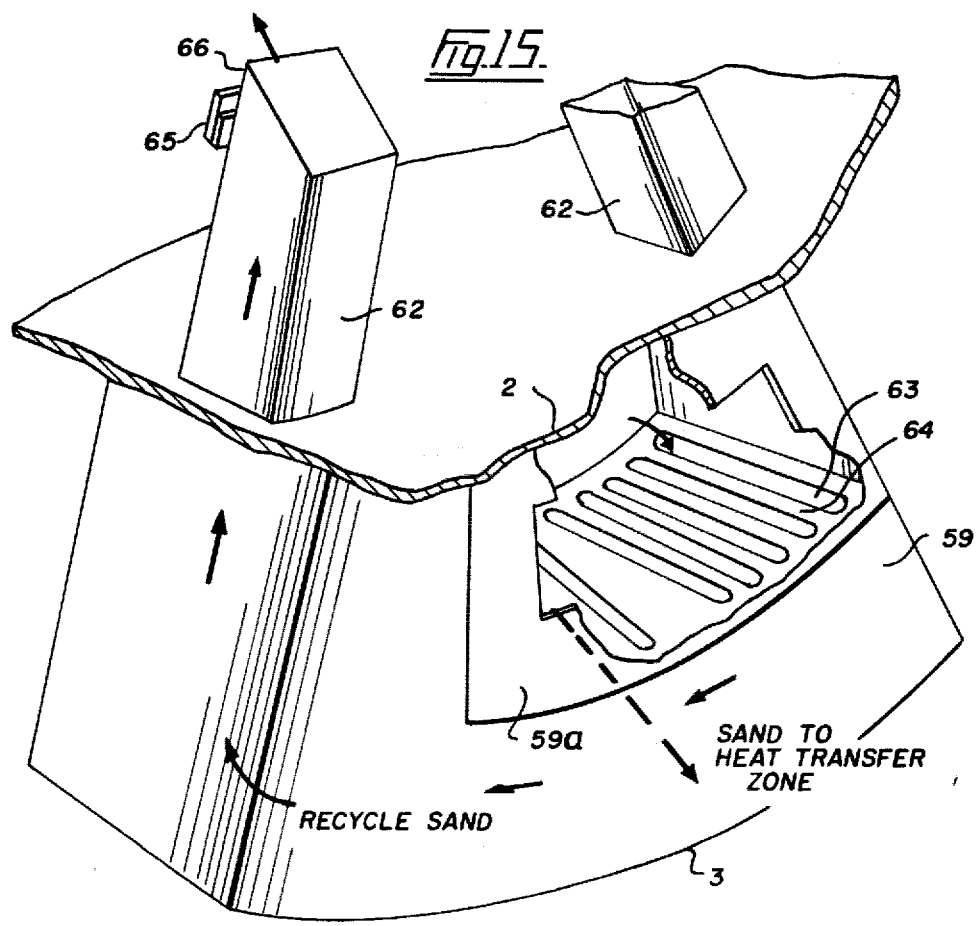
FIG. 15 is a fragmentary perspective view of the recycle means.

Recycling Hot Oil Sand Solids From the Annular Space to the Vaporization Zone The recycle means, as shown in FIGS. 4, 14 and 15 and generally indicated at 10, functions to divert a portion of the hot sand solids being advanced through the annular space A back into the vaporization zone E, where it is combined with the oil sand solids issuing from the preheat zone D. The recycle means 10 includes an annular housing 59 affixed to outer member 3 adjacent the entrance to the vaporization zone E. The annular housing 59 is divided into compartments 60 by dividing walls 61 extending between the walls of the housing 59 and the outer member 3. Recycle tubes 62 extend from each compartment 60 through the walls 19, 16 of the outer and inner members into the vaporization zone E. The recycle tubes 62 are tapered toward the inner member 2. Screened openings 63 are provided through the walls 19 of the outer member 3 into compartments 60.

As the tubular members 2, 3 are rotated, hot sand solids being advanced from the combustion zone F to the heat-exchange zone G pass over the screened openings 63 and fall into the compartments 60 for recycle. The screens 64 prevent large particles from being recycled. As the filled chambers 60 are rotated to an elevated position, the hot sand solids fall through the tapered tubes 62 into the vaporization zone E. The remaining hot sand solids are advanced to the heat-transfer zone G.

It will be understood that, since the hot sand solids passing between the combustion and heat-transfer zones F, G must pass over the screened openings 63, the compartments 60 must be preferentially filled before the excess solids can be advanced to the heat-transfer zone G.

As previously disclosed, the hot tar sand solids at least partially filling the compartments 60 and recycle tubes 62 cooperate with the recycle means 10 to prevent significant gas movement between the annular space A and the vaporization zone E.

To adjust the rate of the recycle flow, removable plate 65 is bolted to each of the tubes 62 to form an outlet opening 66 between the recycle tube 62 and the inner tube 2. By adjusting either the size or location of the plates 65, the dimensions of the outlet openings 66 may be altered thereby adjusting the amount of material being recycled as required to achieve the desired processing result.

Preferably weir plates 59a are provided partially closing the entrance into the heat-transfer zone G. The plate 59a causes hot sand solids being advanced past the recycle means 10 to accumulate over the screened openings 63 before falling into the heat-transfer zone G.

As shown in the drawings, an optional second recycle means (not shown) is provided to recycle hot sand solids from the heat-exchange zone G to the preheat zone D. The second recycle means are provided for use in the event that oil sand solids in the preheat zone D adhere to the inner surface 16 or advance elements 6 of the inner tube 2. The operation and construction of the second recycle means are similar to recycle means 10 described above. A number of the tubes 62 or compartments 60 are closed to recycle only a fraction of the amount of material being recycled by means 10. In most applications the second recycle means is not needed and all compartment openings 63 and recycle tube outlets 66 are closed.

Transferring Coked Solids From the Vaporization Zone to the Combustion Zone

Means 12 are provided at the second end C of the inner tubular means 2 for transferring hot coked solids from the vaporization zone E to the combustion zone F. These means are shown in detail in FIGS. 16 and 17. The second end C of the inner tubular member 2 is provided with spaced inner and outer radial end plates 68, 69 fixed to the walls 16 of said member 2 and sealed around the vapor removal conduit 27. A series of spaced baffles 70 are provided between the plates 68, 69 thereby forming compartments 71. As the inner member 2 rotates, coked solids from the vaporization zone E are fed into these compartments 71 through openings 72 provided near the periphery of the inner radial plate 68. Further rotation causes the solids to fall inwardly toward the central axis of the inner tubular member 2. The baffles 70 are inclined so as to direct the solids toward a central slot 73 located in the outer plate 69 around the vapor discharge conduit 27. The coked solids issuing from the slot 73 fall as a curtain through the space 74 between the second ends C of the tubular members 2,3 into the combustion zone F.

As the coked solids are being discharged through the slot 73, a moving solids seal is formed between the vaporization and combustion zones E, F to prevent significant gas movement between these zones. The circular slot 73 is further sealed during the remaining 360° of rotation by an adjustable seal plate 75. The seal plate 75 is spring mounted to the second end C of the outer tubular member 3 on adjustable rods 76 and sealed around the vapor removal conduit 27. The seal plate 75 is spaced from the circular slot opening 73 by an adjustable distance as set by the length of the rods 76. Spring mounting the plate 75 allows intermittent discharge of oversize material without permitting significant gas movement into the vaporization zone E.

End Seals of the Outer Tubular Member

The first end B of the outer tubular member 3 is sealed by a ring seal 35 between the wall 19 of the member 3 and the stationary feed end structure 4. As previously disclosed, this seal 35 permits a small amount of outside air to be leaked into the annular space A.

The second end C of the outer member 3 is sealed by the ring seal 36 between the stationary product end structure 5 and the wall 19 of the outer member 3. The stationary product end structure 5 is sealed to the vapor discharge conduit 27 by a rotary pipe seal 80.

The vapor discharge conduit 27 preferably comprises an outer stationary section 81 rigidly secured to the rotary pipe seal 80 and a rotating inner section 82 affixed to and rotating with the end plates 68, 69 on the inner tubular member 2.

Introducing Oxygen-Containing Gas

With reference to FIGS. 4 and 18, means B are provided for introducing an oxygen-containing gas, such as air, into the combustion zone F. More particularly, a slotted air discharge plenum 83 is provided in the space 74 between the second ends C of the tubular members 2,3. The plenum 83 is connected through a conduit 84 to a fan 85 which forces heated air through the plenum 83. The air is heated in heat exchangers 77 which recover heat from the hydrocarbon vapours withdrawn from the vaporization zone E. A direct fire burner 14 supplies additional heated air to the combustion zone F to supplement the heating provided by combustion. The plenum 83 is curved in the manner shown in the drawings to allow maximum contact of the heated air with the curtain of hot coked solids issuing from the inner tubular member 2. At the base of the plenum 83 a horizontal plenum nozzle 86 extends a small distance into the annular space A. This nozzle 86 supplies a high velocity stream of air along the annular space A to ensure that combustion continues along the extent of the combustion zone F.

Sand Solids Removal

The sand solids are removed from the annular space A at the first end B of the outer tubular member 3 by means generally indicated at 21 in FIGS. 2 and 4. The sand solids are dropped onto an enclosed conveyor belt 91 external of the outer member 3, where they are cooled and dampened with water. The cooled sands are conveyed through an air lock 87 to a disposal site. The steam resulting from cooling the hot sands, shown as stream K in FIG. 3, is combined with the steam and water vapor stream H from the preheat zone D and cooled in the previously disclosed manner.

Operation

To process oil sand feed material, the temperature in the apparatus is initially raised to about 1000° F. by introducing hot air at a temperature of about 1100° F. through the burner 14. The apparatus 1 is then purged with steam to remove oxygen therefrom. With the tubular members 2, 3 rotating, whole oil sands solids, which may have been prescreened to remove large boulders, are conveyed into the preheat zone D through the feed chute 47. The high angle of attack of the advance plates 6, move the feed material quickly into the preheat zone D. In the preheat zone D, the feed material is heated, dehydrated and ablated as it is advanced therethrough by the inclined advance plates 6.

The heat is provided by heat transferred through the wall 16 of the inner tubular member 2 from the hot sand solids being dropped thereon in the surrounding annular space A. The oil sands are preferably preheated to a temperature of about 450° F. This heating causes a substantial reduction of the bitumen viscosity. As the tubular members 2,3 rotate, the feed material is repeatedly raised and dropped to create a cascading effect. The advance plates 6 and keying elements 6a are closely spaced to aid in this lifting action. This preheating and cascading of the whole oil sand in the preheat zone D causes lumps of oil sand to be ground and reduced in particle size. This combined action also conditions the feed material to release oversize debris such as rocks from the lumps of oil sand. Oversize solids can thus be subsequently removed without losing a large quantity of oil sands.

The preheating step also vaporizes essentially all of the water associated with the oil sand feed material. The temperature in the preheat zone is maintained below about 700° F., to prevent any substantial amount of vaporization of the bitumen. The temperature in the preheat zone D is controlled by the residence time of the feed material therein. Residence time varies with the speed of rotation of the tubular members 2,3 and the size and spacing of the advance plates 6 in the preheat zone D. Alternately the degree of lifting and dropping of the hot sand solids onto the outer surface 16 of the inner member can be varied. The water vapor and steam are withdrawn from the preheat zone D by the suction fan 22 and conduit 23 to the steam condensor 25.

By lowering the viscosity of the bitumen in the oil sand solids, the feed material is much less cohesive and more amenable to flow and to screening of oversize solids.

The steam and water vapor produced in the preheat zone D creates a slightly greater pressure in the preheat zone D than in the vaporization zone E. This provides an inert sealing atmosphere which, together with the partition wall 9, is operative to prevent significant movement of the gases between these two zones D, E.

It will be appreciated that if the amount of water present in the whole oil sand feed material is not sufficient to generate this steam barrier, water may be injected directly into the preheat zone D. Alternately the damper 24 on the steam removal means 7 can be closed so that the steam and water vapor are drawn into the vaporization zone E and removed with the hydrocarbon vapors.

At the second end 50 of the preheat zone D, oversize solids, including rocks and other debris or large lumps of oil sand solids, are separated and removed into the annular space A by the oversize removal means 8. Solids larger than the spacing of the curved bars 51 roll or slide along the bars 51 into the discharge chute 52 and are ejected into the annular space A. In this way, damage to the downstream equipment in the vaporization and combustion zones E, F is prevented.

Downstream of the oversize removal means 8, the de-rocked and preheated oil sand solids are passed through the openings 38 around the periphery of the partition wall 37 into the curved tubular members 55. Rotation of the inner tubular member 2 drops the solids into the vaporization zone E. Since the tubular members 55 are at least partially filled with the solids as the apparatus rotates, the solids cooperate with the wall 37 to restrict gas movement between the zones D, E.

In the vaporization zone E the preheated solids are further heated by introducing hot recycled solids through the recycle means 10 at the first end 88 of this zone. These hot solids recycled from the combustion zone F are typically at a temperature of about 1100°-1300° F. Rotation of the tubular members 2, 3 creates a gentle mixing or cascading action in the vaporization zone E to bring the overall temperature of the solids to about 900°-1000° F. Advance plates 6 and mixing spikes 6b, positioned along the inner surface 16 of the inner tubular member 2 defining the vaporization zone E, advance and mix the solids toward the second end C of the inner member 2. The quantity of hot solids recycled is varied by adjusting the size of the outlet openings 66 provided by the recycle means 10. By varying the amount of solids recycled, the temperature in the zone can be controlled to optimize the degree of vaporization. It is desirable to try to reduce turbulence of the solids in the vaporization zone E to a minimum and thereby reduce the amount of fine particulates in the atmosphere.

The heat added in the vaporization zone E to the oil sand is sufficient to cause thermal cracking and vaporization of a portion of the bitumen and to produce a gaseous hydrocarbon product stream. The product stream is withdrawn from the vaporization zone E through the vapor discharge conduit 27 by the suction fan 26. The vapors are cleaned in one or more dust extractors 28 to remove the fine particulates entrapped therein. The vapors are then cooled and condensed to produce a liquid product. The non-condensible hydrocarbon vapors are further cooled and condensed to produce a gaseous hydrocarbon product.

After vaporizing at least a portion of the bitumen, a coke residue is left in association with the solid mineral particles. The coke residue and mineral solids are collectively referred to as coked solids.

At the second end 89 of the vaporization zone E, the coked solids are transferred into the combustion zone F. As described previously, the means 12 for transferring the coked solids between these zones drops the solids in a curtain-like pattern. The curtain of falling particles is struck by a stream of high velocity hot air emitted from the plenum 83. The hot air supports combustion of at least a portion of the coke residue on the coked solids. By this combustion and supplemental heating with the burner 14, the overall temperature of the coked solids may be raised to about 1100°-1300° F.

The combustion-heated solids are advanced through the annular space A toward the first end B of the outer tubular member 3 by the advance plates 6. A high velocity hot air stream is projected along the annular space A to support combustion therealong. In addition, the combustion-heated solids are preferably lifted and dropped in the combustion zone F by lift elements 90. As shown in FIG. 7, the lift elements 90 are flat-type lifters. This lifting and dropping action provides maximum contact between the air and solids to maximize combustion.

The combustion gases and combustion-heated solids give up a portion of their heat, by convection and conduction, to the inner tubular member 2.

While it is believed that the majority of the combustion takes place in the annular space A, some combustion will also take place in the space 74 between the second ends C of the tubular members 2,3. Thus the term "annular space" as used in the claims should be taken to refer both to the annular space between the walls 16, 19 of the tubular members 2,3 and the space 74 between their second ends C. It is conceivable that the outer tubular member 3 could be extended to enlarge the space 74 if a larger combustion zone is desired.

A portion of the combustion-heated solids are recycled back from the annular space A into the vaporization zone E, to provide the hot recycle solids. As the tubular members 2,3 rotate, the combustion-heated solids are advanced over and fall into the screened openings 63 to the compartments 60. Further rotation of the tubular members 2,3 drops the hot recycle solids through the recycle tubes 62 into the vaporization zone E. The solids at least partially filling the recycle tubes 62 form a moving solids seal between the combustion and vaporization zones E, F to prevent significant gas movement therebetween. Also, since the combustion-heated solids must pass over the screened openings 63 and over the weir plate 59a as they are advanced through the annular space A, the recycle means 10 are preferentially filled before the hot solids are advanced for disposal. This preferential filling of the recycle means 10 ensures a moving solids seal and a supply of hot recycle solids to the vaporization zone E even when the rate of feed material input is temporarily reduced.

That portion of the combustion-heated solids which is not recycled is advanced through the heat-transfer zone G. In the heat-transfer zone G these hot solids are repeatedly lifted and dropped onto the section 15 of the wall 16 of the inner tubular member 2 which defines the preheat zone E. In this way, waste heat from the hot solids is efficiently transferred to the feed material in the preheat zone E. By achieving a sliding solid-solid contact between the wall 16 of the inner member 2 and the hot solids, a desirable amount of heat is transferred. The lifting and dropping of the hot solids is achieved by the cup-faced lifters 44 affixed to the inner surface of the outer tubular member 3. This type of lifter has a large lifting capacity and actually lifts and drops the solids over the top of the rotating inner member 2 to contact the surface area of the inner tubular member 2.

The rate of solids movement through the heat-transfer zone G is relatively slow, as provided by the large spacing and small size of the advance plates 6 in this area. The slow rate of advance allows a maximum amount of heat to be recovered from the hot solids.

A suction fan 26 at the first end C of the outer tubular member 3 withdraws the combustion gases from the annular space A. The combustion gases are passed through a gas cleaning cyclone and wet extractor before being vented to an exhaust stack (not shown).

Solids from the heat transfer zone G, which include oversize solids and combustion-heated solids, are removed by dropping the solids from the first end B of the outer tubular member 3 onto the enclosed conveyor belt 91. The solids are cooled and dampened on the belt 91 by spraying them with a cooling fluid such as water. Steam produced in cooling the solids is directed through the conduit 92, past damper 93 and combined and removed with the steam from the preheat zone D. The dampened solids are conveyed through the air lock 87 to a disposal site. Alternately the solids may be cooled and dampened in the annular space A just prior to being removed from the processor 1. In some cases it may be desirabe to cool and dampen the solids in both the annular space and exterior of the processor as is shown in FIG. 4. The cooling fluid may include thickened sludge withdrawn from the wet dust extractor as shown in FIG. 2.

As described above the gases produced in each of the preheat zone D, vaporization zone E and annular space A are substantially segregated from one another and removed from the apparatus 1 by separate gas removal means 7, 11 and 20 respectively. Preferably the pressures in each of these zones is controlled to maintain a pressure in the vaporization zone E which is less than the pressure in the preheat zone D and annular space A. Most preferably the pressures in the vaporization zone E, preheat zone D and annular space A are maintained at levels which ascend respectively. These pressures are preferably negative with respect to the atmospheric pressure outside the apparatus. This pressure control, as disclosed previously, is operative to maximize the removal of hydrocarbon vapors for recovery while minimizing movement of hydrocarbon vapors into another zone and movement of combustion gases out of the apparatus.

A pilot plant unit processor was operated using Athabasca oil sand from Alberta. The processor was sized to handle 5 tons of feed material per hour. The processor had an inner tubular member having dimensions of 5.5' in diameter by 20' in length. The outer tubular member was 9' in diameter by 22' in length. Both the preheat and heat transfer zones were 12' in length while the vaporization and combustion zones were each 8' in length. The processor was rotated at about 3 to 6 R.P.M. most preferably at 4 R.P.M.

Retention times and temperatures for the various zones are shown in Table 1. A typical product analysis from a particular feed material is shown in Table 2.

TABLE 1

| Zone | Retention Time | Temperature |
|---|---|---|
| Preheat Zone | 4 min. | ambient to 450° F. |
| Vaporization Zone | 2 min. | 450° F.-950° F. |
| Combustion Zone | 1.5 min. | 950° F.-1080° F. |
| Heat-Transfer Zone | 5 min. | 1080° F.-500° F. |
| Final Cooling | <1 min. | 500° F.-180° F. |
| Vapor Exit Temperature | | 970° F. |
| Combustion Gas Exit Temperature | | 520° F. |

TABLE 2

| (For Vapor Zone Temperature 900-1050° F.) | |
|---|---|
| Feed Analysis | Product Analysis |
| Oil 9%, 7°API | Liquid Yield 60-72% of feed |
| Water 7.5% | API gravity 13° API |
| Host Sand and Clay 83.5% | Sediment and Water <2% |
| Sulphur 4.3% | Sulphur 3.7% |
| | Viscosity @ 20° C. 300 c.s. |
| | Coke Yield 18-30% of feed |
| | Crack Gas Yield (C$_4$-) 7-13% of feed |

Due to processing considerations in the test unit auxiliary heating was needed to provide a substantial amount of the heat requirements. Approximately 3 gallons of fuel oil per ton of feed were burned in auxiliary burners.

As previously mentioned, the invention has only been practiced on oil sands. However, it is anticipated that other materials comprising host solids associated with hydrocarbons (such as oil shale) may also be processed by the invention.

It will be realized that oil shales and certain oil sands do not contain connate water. For this reason it may be necessary to inject water or an inert gas into the preheat zone D to maintain an inert atmosphere therein. Such materials may not contain oversize solids, in which case the oversize removal means 8 may be omitted.

While the present invention has been disclosed in connection with the preferred embodiment thereof, it should be understood that there may be other embodiments which fall within the spirit and scope of the present invention as defined in the following claims.

The embodiments of the invention in which an exclusive property or privilege is claimed are defined as follows:

1. Apparatus for recovering hydrocarbons from whole oil said containing sand and clay solids in discrete and lump forms, water, bitumen and oversize rocks, said apparatus comprising:

spaced, substantially horizontal generally concentric inner and outer tubular members having first and second ends, said members being connected to rotate together, said inner member forming substantially open preheat and vaporization zones at its first and second ends respectively, said members combining to form a substantially open substantially annular space between them having a combustion zone at the second end thereof and a heat transfer zone at the first end thereof;

means for supporting and rotating the members;

means for sealing the ends of the outer member and the first end of the inner member; means, extending through the sealing means, for feeding whole oil sand into the preheat zone;

means, carried by the tubular members, for advancing oil sand solids along a path extending through the preheat and vaporization zones and back through the combustion and heat-transfer zones;

said outer member carrying means positioned in the heat transfer zone and adapted to lift hot sand solids being advanced therethrough and to drop them onto a significant portion of the top surface of that section of the wall of the inner member which forms the preheat zone to cause heat to be transferred through such wall section, whereby water in the whole oil sand may be vaporized in the preheat zone and whereby lumps of oil sand may be reduced in size by a combination of heating and cascading effected by rotation of the inner member;

first means, extending through the sealing means, for removing water vapor from the preheat zone;

means, associated with the preheat portion of the inner tubular member, for separating oversize solids from the whole oil sand being advanced through the preheat zone and transferring them into the annular space for disposal;

means, carried by the inner member and extending across the crosssectional area thereof, for restricting gas movement between the preheat and vaporization zones, said means having means in the outer portion thereof operative to permit remaining preheated tar sand to be advanced from the preheat zone into the vaporization zone;

means, associated with the inner tubular member, for recycling hot sand solids, being advanced through the annular space, into the first end of the vaporization zone for mixing with oil sand issuing from the preheat zone to raise its temperature and thereby vaporize and crack hydrocarbons and produce coked solids, said means cooperating with the hot sand solids to prevent significant gas movement therethrough between the annular space and the vaporization zone;

second means for removing gases from the vaporization zone for recovery;

means, associated with the inner tubular member at its second end, for transferring coked solids from the vaporization zone to the combustion zone, said means cooperating with the coked solids to prevent significant gas movement therethrough between said zones;

said second means extending through the sealing means and being associated with the coked solids transfer means;

means for introducing oxygen-containing gas into the combustion zone for burning coke to produce hot sand solids;

third means, associated with the sealing means, for drawing combustion gas from the annular space for disposal; and means, associated with the sealing means, for removing sand solids from the heat transfer zone for disposal.

2. The apparatus as set forth in claim 1, which further comprises:

means, associated with the inner tubular member, for lifting and mixing whole oil sands in the preheat zone.

3. The apparatus as set forth in claim 1, which further comprises:

means, associated with the outer tubular member, for cooling and dampening the sand solids issuing from the heat transfer zone.

4. The apparatus as set forth in claim 1 comprising means, associated with the sealing means, for supplying supplemental heat to the combustion zone.

5. The apparatus as set forth in claim 4 wherein:

said third means comprises a first fan and conduit, said first fan being connected with said first conduit, said first conduit communicating with said annular space, said means being operative to maintain a negative pressure, relative to atmospheric pressure, in said annular space;

said first means comprises a second fan and conduit, said second fan being connected with said second conduit, said second conduit communicating with said preheat zone, said means being operative to maintain a negative pressure, relative to atmospheric pressure, in said preheat zone; and said second means comprises a third fan and conduit, said third fan being connected with said third conduit, said third conduit communicating with said vaporization zone, said means being operative to maintain a negative pressure, relative to atmospheric pressure, in said vaporization zone.

6. The apparatus as set forth in claim 5 comprising:

means for controlling said first, second and third means whereby the pressure in the vaporization zone is less than that in the preheat zone and annular space.

7. Apparatus for recovering hydrocarbons from host solids containing hydrocarbons, said apparatus comprising:

spaced, substantially horizontal generally concentric inner and outer tubular members having first and second ends, said members being connected to rotate together, said inner member forming substantially open preheat and vaporization zones at its first and second ends respectively, said members combining to form a substantially open substantially annular space between them having a combustion zone at the second end thereof and a heat transfer zone at the first end thereof;

means for supporting and rotating the members;

means for sealing the ends of the outer member and the first end of the inner member;

means, extending through the sealing means, for feeding the host solids into the preheat zone;

means, carried by the tubular members, for advancing host solids along a path extending through the preheat and vaporization zones and back through the combustion and heat-transfer zones;

said outer member carrying means positioned in the heat transfer zone and adapted to lift hot sand solids being advanced therethrough and to drop them onto a significant portion of the top surface of that section of the wall of the inner member which forms the preheat zone to cause heat to be transferred through such wall section to preheat the host solids;

first means, extending through the sealing means, for removing water vapor from the preheat zone;

means, carried by the inner member and extending across the cross-sectional area thereof, for restricting gas movement between the preheat and vaporization zones, said means having means in the outer portion thereof operative to permit remaining preheated host solids to be advanced from the preheat zone into the vaporization zone;

means, associated with the inner tubular member, for recycling hot solids, being advanced through the annular space, into the first end of the vaporization zone for mixing with host solids issuing from the preheat zone to raise its temperature and thereby vaporize and crack hydrocarbons and produce coked solids, said means cooperating with the hot solids to prevent significant gas movement therethrough between the annular space and the vaporization zone;

second means for removing gases from the vaporization zone for recovery;

means, associated with the inner tubular member at its second end, for transferring coked solids from the vaporization zone to the combustion zone, said means cooperating with the coked solids to prevent significant gas movement therethrough between said zones;

said second means extending through the sealing means and being associated with the coked solids transfer means;

means, associated with the sealing means, for introducing oxygen-containing gas into the combustion zone for burning coke to produce hot solids;

third means, associated with the sealing means, for drawing combustion gas from the annular space for disposal; and means, associated with the sealing means, for removing solids from the heat transfer zone for disposal.

8. The apparatus as set forth in claim 7 comprising means, associated with the sealing means, for supplying supplemental heat to the combustion zone.

9. The apparatus as set forth in claim 8, which further comprises:

means, associated with the inner tubular member, for separating oversize solids from the host solids being advanced through the preheat zone and transferring them into the annular space for disposal.

* * * * *